(12) United States Patent
McLeod

(10) Patent No.: US 7,315,549 B2
(45) Date of Patent: Jan. 1, 2008

(54) FORMATTING DATA FOR A BUFFER

(75) Inventor: Gordon R. McLeod, Linlithgow (GB)

(73) Assignee: Intel Corporation, Santa Clara, CA (US)

( * ) Notice: Subject to any disclaimer, the term of this patent is extended or adjusted under 35 U.S.C. 154(b) by 1005 days.

(21) Appl. No.: 10/626,780

(22) Filed: Jul. 24, 2003

(65) Prior Publication Data

US 2005/0018664 A1   Jan. 27, 2005

(51) Int. Cl.
*H04L 12/56* (2006.01)

(52) U.S. Cl. ...................... 370/412; 370/463

(58) Field of Classification Search ............... 370/371, 370/381, 412, 419, 429, 463
See application file for complete search history.

(56) References Cited

U.S. PATENT DOCUMENTS

| | | | | |
|---|---|---|---|---|
| 4,754,451 A | * | 6/1988 | Eng et al. | 370/417 |
| 4,991,172 A | * | 2/1991 | Cidon et al. | 370/400 |
| 6,044,061 A | * | 3/2000 | Aybay et al. | 370/230 |
| 6,122,320 A | * | 9/2000 | Bellifemine et al. | 375/240 |
| 6,798,784 B2 | * | 9/2004 | Dove et al. | 370/463 |
| 6,839,322 B1 | * | 1/2005 | Ashwood Smith | 370/235 |
| 6,954,885 B2 | * | 10/2005 | Hurt et al. | 714/701 |
| 6,982,991 B1 | * | 1/2006 | Atoji | 370/474 |
| 7,006,497 B2 | * | 2/2006 | Dove et al. | 370/390 |
| 2003/0118058 A1 | * | 6/2003 | Kim et al. | 370/535 |

OTHER PUBLICATIONS

Intel® IXF1010 10-port 100/1000 Mbps Ethernet Media Access Controller With System Packet Interface Level 4 Phase 2 (SPI4-2), Product Description. Intel Corporation 2002. developer.intel.com.
Intel® Common System-Level Interface Connecting 10 GbE LANs/WANs to OC-192 MANs, White Paper. Aug. 30, 2002.
SPI-4 Phase 2 Performance in Gigabit Ethernet Media Access Controllers, Application Note. Intel Corporation. Apr. 2002.
IXF18101 10 Gbps Physical Layer Device. Intel® Developer. http://www.intel.com/design/network/products/optical/framers/ixf18101.htm. Accessed Jun. 16, 2003.

* cited by examiner

*Primary Examiner*—Thong Vu
(74) *Attorney, Agent, or Firm*—Trop, Pruner & Hu, P.C.

(57) ABSTRACT

In one embodiment of the present invention, a method includes writing a first variable length packet to a first portion of a buffer, and writing a second variable length packet to a second portion of the buffer while writing the first variable length packet. The buffer may receive incoming data packets from a system packet interface, in certain embodiments.

20 Claims, 5 Drawing Sheets

FORMATTING DATA FOR A BUFFER

BACKGROUND

The present invention relates to transferring data via communication protocols, and more particularly to transferring data through a buffer.

Many different communication protocols exist to control data communication. Such protocols include 10 Gigabit Medium Independent Interface (XGMII) and System Packet Interface Level 4 Phase 2 (SPI-4 Phase 2 or "SPI-4", as used herein). As an example, SPI-4 is a versatile general-purpose interface for exchanging packets anywhere within or among communication systems, as it is an interface for packet and cell transfer between a physical layer (PHY) device and a link layer device. The SPI-4 protocol expresses packets in words of fixed length, with new packets byte-aligned to the start of a word. For some packet lengths, the end of a packet must be padded with idles to fill the last word. When data is passed between systems with different protocols, this padding has to be changed to suit the new word length.

In higher speed applications, there are no extra cycles to handle padding operations. Thus there is a need to 'keep up' with input data by handling any padding requirements in a single cycle. In very high speed interfaces, internal logic may have to operate on several consecutive words, meaning that a single cycle may have to deal with data from more than one packet, while also having to deal with padding requirements between packets. Thus a need exists to appropriately buffer and format variable length data packets.

DETAILED DESCRIPTION

Figure 1:
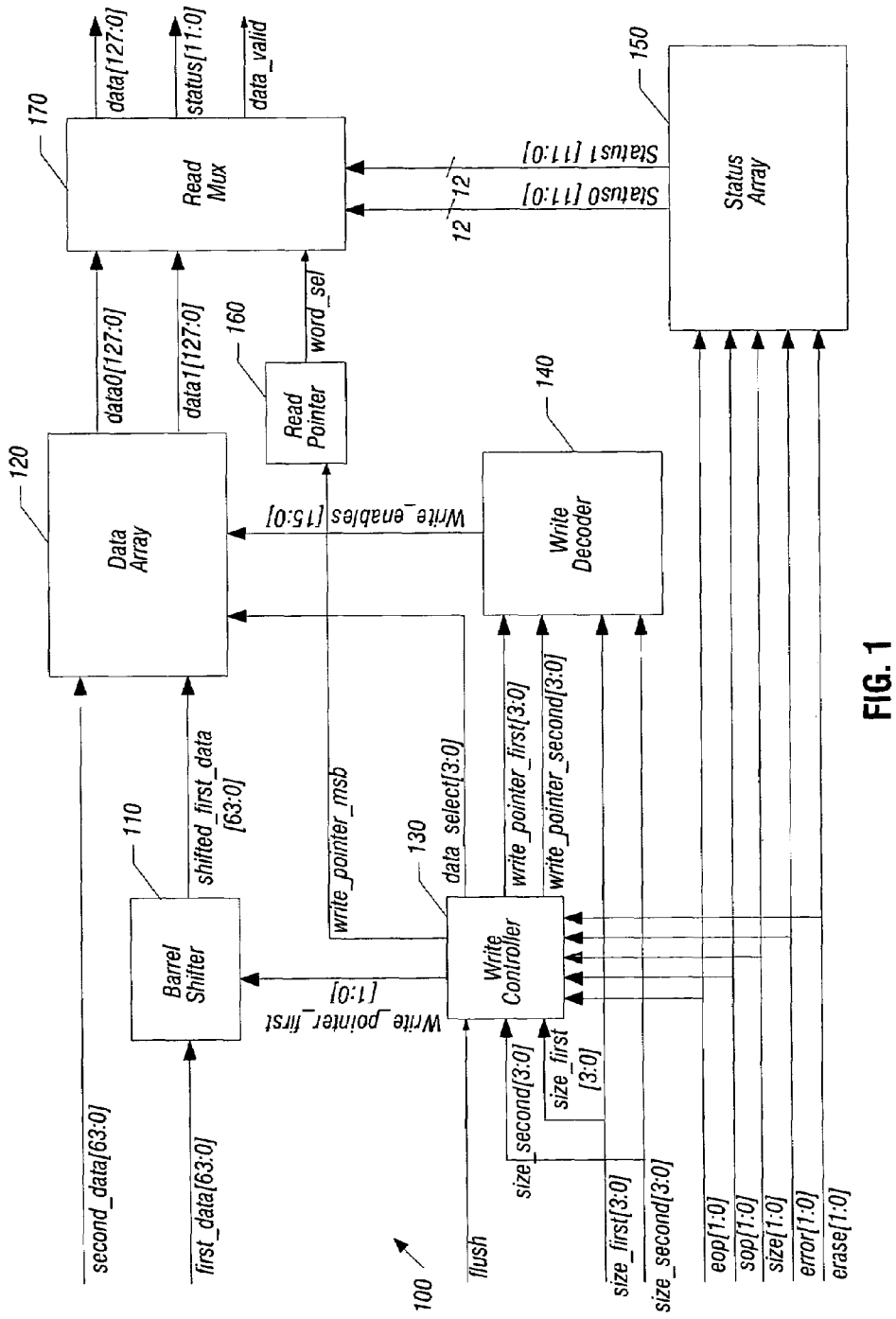
FIG. 1 is a block diagram of a buffer in accordance with one embodiment of the present invention.

Referring to FIG. 1, shown is a block diagram of a storage buffer in accordance with one embodiment of the present invention. Such a buffer may be used to reformat data received and store the same for later output. Buffer 100 is adapted to receive data packets via a first data port (e.g., via first_data lines) and a second data port (e.g., via second_data lines), allowing data from consecutive packets to be stored independently. In one embodiment, each data port may be adapted to receive variable length data packets having up to 64 bits. In various embodiments, such data packets may include between one and four 16-bit words.

During packet transfer, data is typically written to the first data port, but data from the end of one packet may arrive with the start of the following packet in this case, the two ports may be used to keep data from the different packets apart. In such manner, data from the second packet may be correctly aligned in the next available word, independently of the first packet.

In various embodiments, a storage buffer, such as buffer 100, may be used to pack incoming packet data and pad the end of packet words. In such embodiments, each cycle may handle data from two incoming packets and store them with the correct alignment and padding. Although the peak input word size may be the same as the output word size, the input port of the buffer may have great flexibility over how many words can be stored and exactly where they can be stored.

In various embodiments, several processing steps may be accomplished in a single cycle without incurring excessive complexity or combinatorial delays. In such manner, flexibility of the input port arrangement may accommodate corner cases which occur, for example, when an SPI-4 input is processed at four words per cycle and reformatted for a protocol with a much larger word length.

As shown in FIG. 1, buffer 100 includes a barrel shifter 110, a data array 120, a write controller 130, a write decoder 140, a read pointer 160, a status array 150, and a read multiplexer 170. As shown in FIG. 1, buffer 100 also includes a number of control inputs or ports, in addition to the data ports. Control ports size_first and size_second identify how many words are valid for each data port. In the embodiment of FIG. 1, between zero and four words may be written to each port, although the scope of the present invention is not limited in this respect.

Other inputs on the control ports of buffer 100 may be used to input status information about packets arriving on the first (e.g., bit 1) and second (e.g., bit 0) data ports. For example, a start of packet (sop) input may go high if the corresponding port contains words from the start of a packet. Similarly, an end of packet (eop) input may indicate if a port contains the end of a packet. The size input may be used to determine if one or both bytes in the last word of a packet are valid. Error inputs may indicate when errors have been detected in a packet on a given port. The erase input may indicate when a packet is to be dropped.

In one embodiment, data array 120 may be an array of 2×128-bit words. In such manner, 8 SPI-4 words may be accommodated, and the array may be matched to the width of the parallel bus to which it is connected. Data for the first port may arrive on the first_data input lines. Barrel shifter 110 may be used to pre-rotate first_data to ensure that the 16-bit words align correctly with data that was written previously. The two least significant bits (LSBs) of the write pointer signals (i.e., write_pointer_first [1:0]) from write controller 130 may control the shifting operation. In certain embodiments, rotation may be desired because each input cycle can write 0, 1, 2, 3 or 4 16-bit data words, requiring the next words to be pre-rotated to avoid leaving a gap. Because second_data may be input from the start of a packet it may be written to data array 120 without rotation, if necessary leaving a gap at the end of the previous packet.

In various embodiments, write controller 130 may use the position of the last write and the size of the two incoming data blocks to determine where they should be stored in data array 120. The position of the last write may be calculated by examining the position and size of each data block. This value may then be stored in a write pointer register of write controller 130. The write_pointer_first output provided to write decoder 140 may point to the location where the first 16-bit word of first_data may be stored. The write_pointer_second output may point to the location where the first 16-bit word of second_data may be stored.

In certain embodiments, a flush input to write controller 130 may be used to transfer residual data from buffer 100 to a first in first out (FIFO) buffer to which it is connected, even if the current word is incomplete if a significant gap in the data stream is detected.

In certain embodiments, write controller 130 may use conventional arithmetic to calculate a beginning and end address for each data block. A fragment of a Verilog register transfer level (RTL) for use in write controller 130 in accordance with one embodiment is shown below in Table 1:

TABLE 1

```
1   data_sel=0;
2   if (first_size==0)
3   begin
4      end_first=write_pointer;
5      next_write_pointer=write_pointer;
6   end
7   else
8   begin
9      next_write_pointer=write_pointer;
10     end_first=write_pointer-{1'b0,first_size};
11     if (eop_out[1])
12        next_write_pointer={end_first [3:2],2'b00};
13     else
14        next_write_pointer=end_first;
15  end // else: !if(first_size==0)
16  if (second_size==0)
17  begin
18     end_second=end_first;
19  end
20  else
21  begin
22     end_second=next_write_pointer-{2'b0,second_size};
23     data_sel [end_second[3:2]]=sop_out[0];
24     if (eop_out[0])
25        next_write_pointer={end_second[3:2],2'b00};
26     else
27        next_write_pointer=end_second;
28  end // else: !if(second_size==0)
```

Because higher bytes of the word are used first, subtraction rather than addition may be used. All of the code set forth in Table 1 is combinatorial, and the register write_pointer may be declared elsewhere.

Now referring to the code segment of Table 1, on line 1 data_sel is assigned to 0. This is the default configuration, leaving all four 64-bit elements of data array 120 loading data from the first port via signal lines [3:0] to data array 120. The first_size==0 clause (lines 2 to 6) ensures that end_first and next_write_pointer are correctly assigned when no data is written. The else clause (lines 7 to 15) calculates where the first block ends, and assigns next_write_pointer accordingly. (Note that the variables first_size and second_size correspond to signals size_first and size_second; and next_write_pointer corresponds to a write_pointer signal). In certain embodiments, next_write_pointer may point to the end of the first data block, but if an eop signal is detected, the 2 LSBs may be cleared to ensure that following data is aligned correctly with the start of the next word, leaving a gap if required. Note that first_size is sign extended before being subtracted on line 10.

Still referring to Table 1, lines 16 to 28 deal with the case when data is applied on the second data port. The second data port may only be used when first_data contains the end of a packet, in certain embodiments. This means that when second_size=0, next_write_pointer may always have been rounded down to a multiple of 4 by line 12. In this embodiment, second_data may only contain a maximum of two 16-bit words, allowing the width of second_size to be reduced to two. This requires that second_size be sign extended by 2 on line 22. Line 18 assigns end_second to end_first if there is no second data to be written.

Note that throughout this combinatorial calculation, next_write_pointer accumulates with further offsets being added as required. The two most significant bits (MSBs) of end_second indicate which location in data array 120 data from a new packet will reside in and may directly determine which bit of data_select should be set to select second_data into the appropriate word. Lines 24 to 27 serve as a reminder that very small packets can occur, causing the words in second_data to include both the beginning and end of a packet, in which case write_pointer is rounded down to the nearest multiple of 4 as per line 12.

The great flexibility of write controller 130 may be illustrated by the fact that when data is written to buffer 100, the write_pointer may be incremented by between 1 and 8, in certain embodiments. This flexibility, in combination with self-regulating output reads from buffer 100, allows the flow of incoming data to directly control the flow of data into an output FIFO without any management state machines.

Referring again to FIG. 1, in certain embodiments, write decoder 140 may use the start address (i.e., write_pointer_first and write_pointer_second) and size for each data block to assert individual write enables to ensure that the data blocks are correctly stored in data array 120. In various embodiments, write decoder 140 may be used to allow variable length blocks to be written anywhere in data buffer 120. That is, data blocks are not stored at predetermined locations (e.g., for first_data and second_data), but rather at dynamic locations as determined by write decoder 140.

In such embodiments, a register file of data array 120 may be divided into 4×64-bit elements, each of which may load data from first_data or second_data lines. A further output from write controller 130 (data_select) may be used to control which, if any, of the register file elements may store data from the second data port. At any given time, one element may load second_data and all others may load first_data, in certain embodiments.

Figure 2:
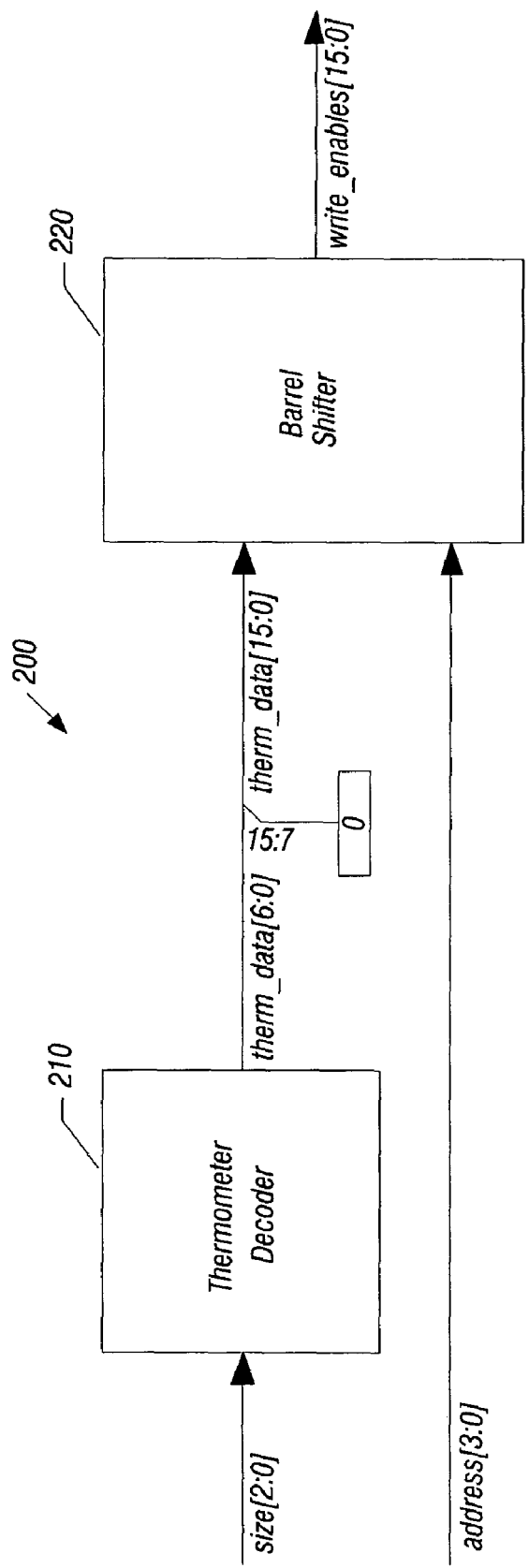
FIG. 2 is a block diagram of a multiple decoder in accordance with one embodiment of the present invention.

Referring now to FIG. 2, shown is a block diagram of a multiple decoder in accordance with one embodiment of the present invention. Such a multiple decoder may be a basic building block of write decoder 140. As shown in FIG. 2, multiple decoder 200 may include a thermometer decoder 210 and a barrel shifter 220 coupled thereto. Multiple decoder 200 may receive an n-bit input port (e.g., size) which is used to express how many of the outputs of thermometer decoder 210 go high. These outputs may be used to set the size of the variable length blocks to be written to data array 120.

The truth table for thermometer decoder 210 of the embodiment of FIG. 2 is shown in Table 2:

TABLE 2

| size [2:0] | therm_data [6:0] |
| --- | --- |
| 000 | 0000000 |
| 001 | 0000001 |
| 010 | 0000011 |
| 011 | 0000111 |
| 100 | 0001111 |
| 101 | 0011111 |
| 110 | 0111111 |
| 111 | 1111111 |

Referring still to FIG. 2, the output of thermometer decoder 210 may be zero-extended up to 16-bits. In the embodiment of FIG. 2, at any one time a maximum of seven of the 16 bits can be high, as shown in Table 2. The thermometer decoder 210 may be used to set the size of the block to be written, while barrel shifter 220 may rotate the 16 bits to ensure that the data block is written to the correct memory location. In the embodiment shown in FIG. 2, an address input (i.e., a write_pointer signal) may determine the rotation of the thermometer data signals. Because of the zero extension on the therm_data output from thermometer decoder 210 in the embodiment of FIG. 2, a full 16×16 barrel shifter is not required, and logic synthesis may reduce it to 16 8:1 multiplexers, in one embodiment. The output of barrel shifter 210, write_enables, may be used to enable write operations to data array 120.

Figure 3:
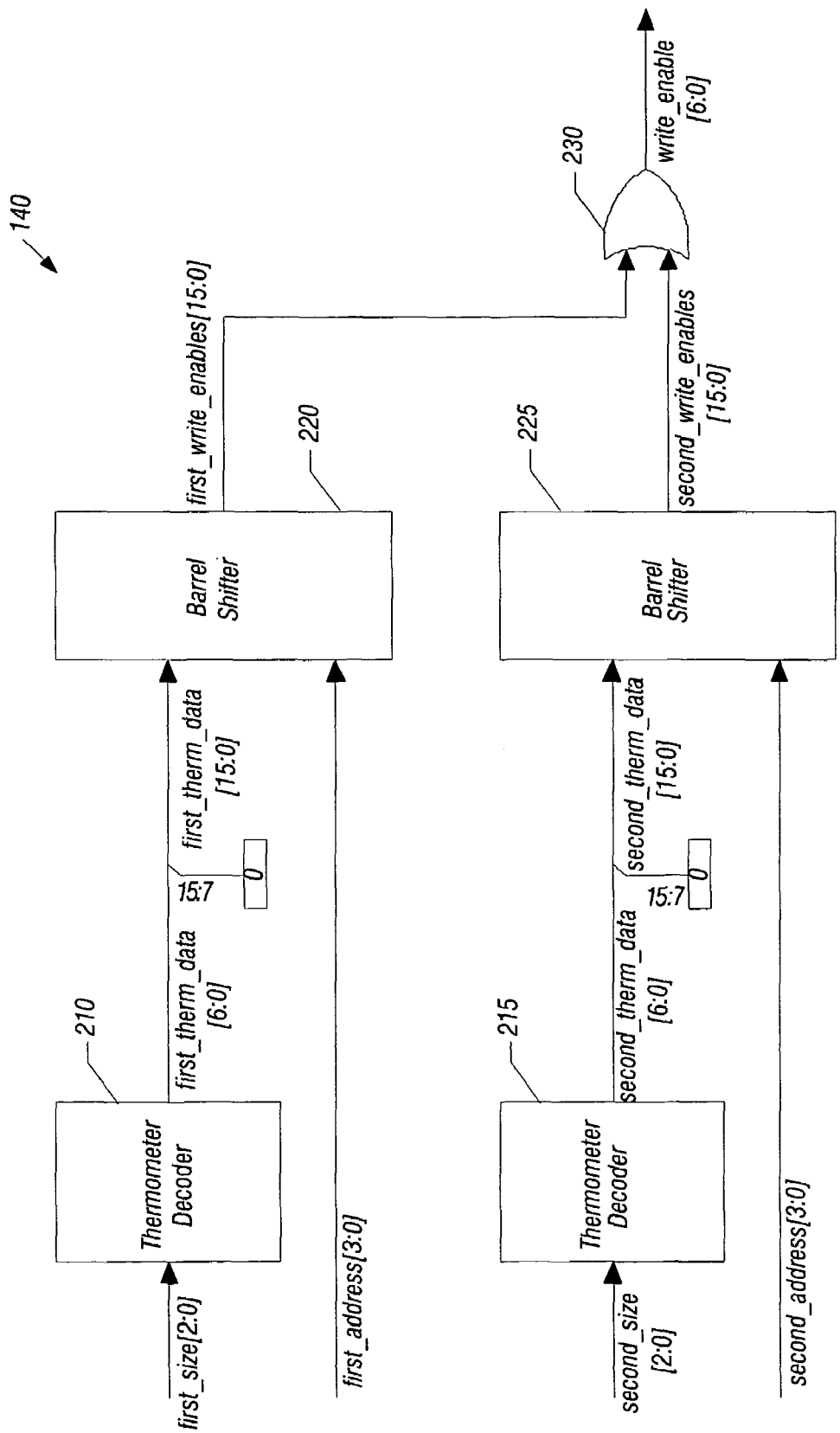
FIG. 3 is a block diagram of a write decoder in accordance with one embodiment of the present invention.

Referring now to FIG. 3, shown is a block diagram of a write decoder 140 in accordance with one embodiment of the present invention. As shown in FIG. 3, write decoder 140 may include a pair of multiple decoders. Specifically, a first multiple decoder may be formed by thermometer decoder 210 and barrel shifter 220 and a second multiple decoder may be formed by thermometer decoder 215 and barrel shifter 225. As shown in FIG. 3, the 16-bit outputs of the two multiple decoders are OR'ed together via OR logic 230, allowing two independent data blocks to be written to non-overlapping locations in data array 120 via output signals write_enable [6:0].

cause an output therefrom to enable data multiplexer 124 to receive a data bit from either a first packet or a second packet of data. The data received by data multiplexer 124 is then provided to flip-flop 126 for storage. Upon output, the bit of data is sent out of data array 120 via a data out (dout) line.

Figure 4:
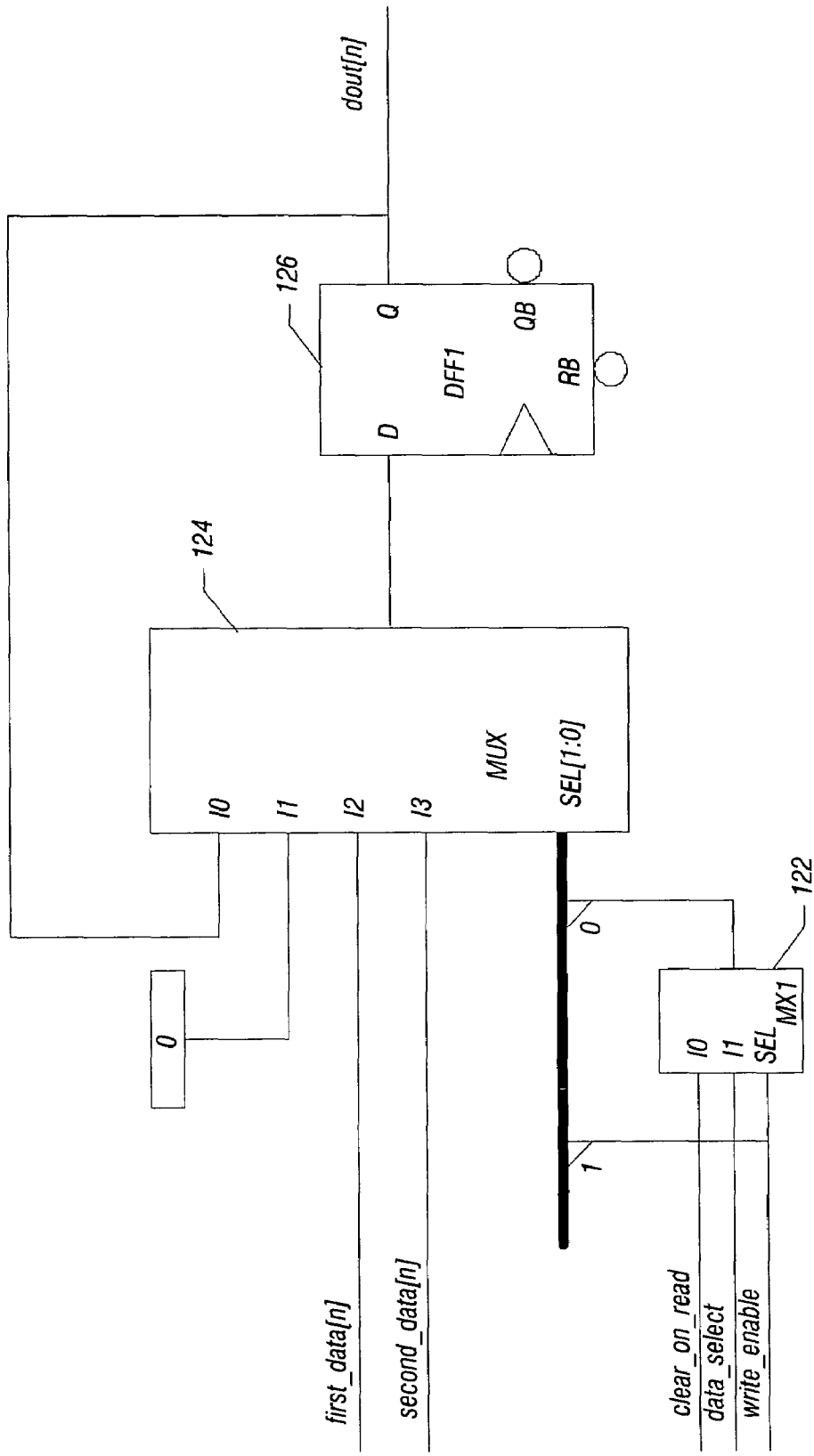
FIG. 4 is a block diagram of a bitslice of a data array in accordance with one embodiment of the present invention.

In the embodiment of FIG. 4, when a write_enable signal (from write decoder 140) goes high, data may be loaded into flip-flop 126. When data is being loaded, data_select may determine if it comes from the first data port or second data port.

When data is not being written, it is normally held at its previous value, but if a clear_on_read input is high it is cleared. The clear_on_read signal may be used to remove words from data array 120 as soon as they are read to make space available for more writes. In certain embodiments, write_enable may take priority over clear_on_read, thus a clear is not required if new data is being written and does not obstruct the write.

Control and data connectivity to 16 16-bit words stored in buffer 120 in accordance with one embodiment is shown below in Table 3:

TABLE 3

| Cell | clear_on_read | data_sel | write_enable | first_data | second_data | Output word |
|---|---|---|---|---|---|---|
| Cell0 | clear_on_read[0] | data_sel[0] | write_enable[0] | first_data[15:0] | second_data[15:0] | Word0[15:0] |
| Cell1 | clear_on_read[0] | data_sel[0] | write_enable[1] | first_data[31:15] | second_data[31:15] | Word0[31:16] |
| Cell2 | clear_on_read[0] | data_sel[0] | write_enable[2] | first_data[47:32] | second_data[47:32] | Word0[47:32] |
| Cell3 | clear_on_read[0] | data_sel[0] | write_enable[3] | first_data[63:48] | second_data[63:48] | Word0[63:48] |
| Cell4 | clear_on_read[0] | data_sel[1] | write_enable[4] | first_data[15:0] | second_data[15:0] | Word0[79:64] |
| Cell5 | clear_on_read[0] | data_sel[1] | write_enable[5] | first_data[31:15] | second_data[31:15] | Word0[95:80] |
| Cell6 | clear_on_read[0] | data_sel[1] | write_enable[6] | first_data[47:32] | second_data[47:32] | Word0[111:96] |
| Cell7 | clear_on_read[0] | data_sel[1] | write_enable[7] | first_data[63:48] | second_data[63:48] | Word0[127:112] |
| Cell8 | clear_on_read[1] | data_sel[2] | write_enable[8] | first_data[15:0] | second_data[15:0] | Word1[15:0] |
| Cell9 | clear_on_read[1] | data_sel[2] | write_enable[9] | first_data[31:15] | second_data[31:15] | Word1[31:16] |
| Cell10 | clear_on_read[1] | data_sel[2] | write_enable[10] | first_data[47:32] | second_data[47:32] | Word1[47:32] |
| Cell11 | clear_on_read[1] | data_sel[2] | write_enable[11] | first_data[63:48] | second_data[63:48] | Word1[63:48] |
| Cell12 | clear_on_read[1] | data_sel[3] | write_enable[12] | first_data[15:0] | second_data[15:0] | Word1[79:64] |
| Cell13 | clear_on_read[1] | data_sel[3] | write_enable[13] | first_data[31:15] | second_data[31:15] | Word1[95:80] |
| Cell14 | clear_on_read[1] | data_sel[3] | write_enable[15] | first_data[47:32] | second_data[47:32] | Word1[111:96] |
| Cell15 | clear_on_read[1] | data_sel[3] | write_enable[15] | first_data[63:48] | second_data[63:48] | Word1[127:112] |

Thus the ability to control the writing of two independent, variable length data blocks into memory may be realized via write controller 130 and write decoder 140. In certain embodiments, the logic delays of write controller 130 and write decoder 140 may be sufficiently small for both operations to be performed in a single cycle.

Referring now to FIG. 4, shown is a bitslice from data array 120 in accordance with one embodiment of the present invention. Internally, data array 120 may be organized as 16×16-bit words, in one embodiment. As shown in FIG. 4, a bitslice for a given bit of incoming data may include a select multiplexer 122, a data multiplexer 124, and a D-type flip-flop 126 which stores the register bit. As shown in FIG. 4, control signals provided to select multiplexer 122 may As shown in Table 3, based on the assertion of various control signals including clear_on_read, data_select, and write_enable, it may be determined which data packet is stored at which location of data array 120, and of which output word the data is a part.

Referring again to FIG. 1, status array 150 may be used to store status information to be provided along with each output word of data array 120. The format of the status information may be changed to match new word lengths. In one embodiment, one sop, one eop and one error bit may be stored for each output, but the width of the size field may be increased to express the number of bytes used in the last packet. In such an embodiment, a 128-bit output from buffer 100 may contain a pair of independent 64-bit words, each with its own status words.

In one embodiment, read pointer 160 may 1-bit wide, and may be used to determine which of two 128-bit output words is to be routed to the output at any given time. In certain embodiments, higher level flow control may be used to ensure that data is applied to the buffer input only if there is space to store it in the FIFO connected to its output. Thus in certain embodiments, it may be assumed that if the output strobe data_valid is asserted to indicate that the current output word is valid, the FIFO will store it immediately. The read mechanism of read pointer 160 may compare the word_sel signal to the MSB of the write_pointer to determine when the next complete word is available. Because no state machines other than the read and write pointers themselves are used to control when the output is valid, data may be accumulated and drained from the buffer in an extremely flexible manner, in certain embodiments.

In an embodiment in which there are two 128-bit output words, read pointer 160 may be 1-bit wide. In such an embodiment, read logic of read pointer 160 may detect when the MSB of write_pointer (i.e., write_pointer_msb) changes state, indicating that one of the 128-bit output words has been completed. This causes data_valid to be asserted in read multiplexer 170 and toggles the word_sel signal which causes the new word to be selected through read multiplexer 170. In various embodiments the new word may be read immediately.

Thus in certain embodiments, the self-adjusting read pointer may allow the entire data pipeline to automatically adjust its throughput to the peculiarities of the input without a management state machine or inter-stage feedback connections. In various embodiments, a buffer may be used when a data stream of short, unpredictable and inconsistent bursts is to be reformatted into words of greater width.

Figure 5:
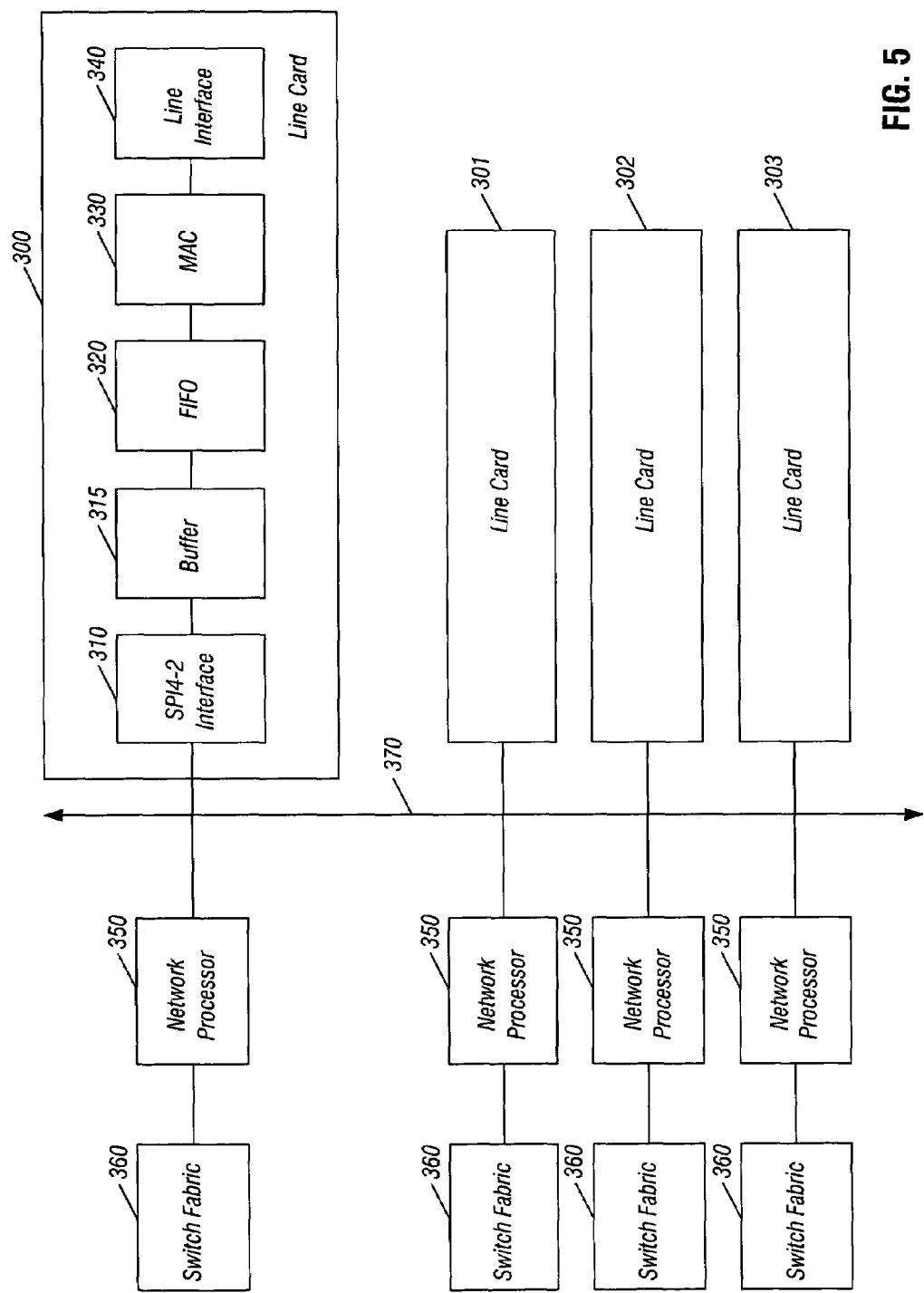
FIG. 5 is a block diagram of a system in accordance with one embodiment of the present invention.

Referring now to FIG. 5, shown is a block diagram of a system in accordance with one embodiment of the present invention. The system of FIG. 5 may be part of a switching system, for example. As shown in FIG. 5, the system may include a plurality of line cards 300-303, each of which may be coupled to a network processor 350 and a switch fabric 360. A bus 370 may couple the line cards 300-303 to each other. In one embodiment, bus 370 may be an external SPI-4 10 Gigabits per second (Gbps) bus. In other embodiments, other buses may be used.

As shown in FIG. 5, one example line card 300 may include a SPI4-2 interface 310 which is coupled to a buffer 315. In one embodiment, buffer 315 may be identical to buffer 100 discussed above with regard to FIG. 1. Buffer 315 may be coupled to a FIFO 320 which is coupled to a media access controller (MAC) 330, which in turn is coupled to a line interface 340. Such a line interface may vary depending upon the particular purpose of the line card. For example, in one embodiment line interface 340 may be used to interface line card 300 to a 10 Gigahertz (GHz) synchronous optical network (SONET) connection. Other line interfaces may include an Ethernet line interface, another optical line interface, a generic framing protocol interface and the like.

The system of FIG. 5 may be used in various networks including for example a metro area network (MAN), a local area network (LAN), or a wide area network (WAN) for example.

Embodiments may be implemented in a computer program that may be stored on a storage medium having instructions to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic RAMs and static RAMS, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device, such as a processor or a custom-designed state machine, for example, write controller 130 of FIG. 1.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    writing a first variable length packet to a first portion of a buffer via a first port of the buffer, wherein the first variable length packet is pre-rotated prior to the writing to align the first variable length packet with a previous packet under control of a write pointer signal;
    writing a second variable length packet to a second portion of the buffer via a second port of the buffer while writing the first variable length packet, wherein the second variable length packet is written without the pre-rotation; and
    transmitting an output word from the buffer corresponding to one of the first and second variable length packets, wherein the output word has a fixed length.

2. The method of claim 1, further comprising dynamically determining the location of the first portion based on a position of a previous packet and a size of the first variable length packet.

3. The method of claim 1, further comprising padding the first variable length packet to form a first output packet.

4. The method of claim 3, further comprising outputting the first output packet when a next variable length packet is received by the buffer.

5. The method of claim 1, wherein the first portion is at any location of the buffer.

6. The method of claim 1, further comprising writing the first and second variable length packets to a data array of the buffer, the data array including a plurality of elements, each of which may load data from either one of the first or second variable length packets.

7. An apparatus comprising:
    a write decoder including a thermometer decoder to set a packet size of a variable length packet, the thermometer decoder having n inputs corresponding to a size of the variable length packet and m outputs, the thermometer decoder to select how many of the m outputs are active based on the n inputs to set the size of the variable length packet, and a first shifter coupled to the thermometer decoder to receive the m outputs and an address input and to determine an amount of rotation for the m outputs based on the address input; and
    a data array coupled to the write decoder to store the variable length packet under enablement by an output of the first shifter.

8. The apparatus of claim 7, further comprising a second shifter coupled to the data array to rotate the variable length packet prior to entry in the data array.

9. The apparatus of claim 7, wherein the data array includes a plurality of elements, each of which may load data from either one of the first or second variable length packets.

10. The apparatus of claim 9, wherein the data array is to write a second variable length packet to a second portion of the buffer via a second port of the buffer while writing of the first variable length packet via a first port of the buffer, wherein the second variable length packet is written without the pre-rotation, and to transmit an output word from the buffer corresponding to one of the first and second variable length packets, wherein the output word has a fixed length.

11. An article comprising a machine-readable storage medium containing instructions that if executed enable a system to:

write a first variable length packet to a first portion of a buffer via a first port of the buffer, wherein the first variable length packet is pre-rotated prior to the writing to align the first variable length packet with a previous packet under control of a write pointer signal;

write a second variable length packet to a second portion of the buffer via a second port of the buffer while the first variable length packet is written, wherein the second variable length packet is written without the pre-rotation; and transmit an output word from the buffer corresponding to one of the first and second variable length packets, wherein the output word has a fixed length.

12. The article of claim 11, further comprising instructions that if executed enable the system to determine the location of the first portion based on a position of a previous packet and a size of the first variable length packet.

13. The article of claim 12, wherein the location of the first portion may be at any location in the buffer.

14. A system comprising:
a switch fabric; and
a storage buffer coupled to the switch fabric to store at least two variable length packets in a data array, the storage buffer having a decoder to set a packet size of the variable length packets, the decoder including a thermometer decoder to set a packet size of the variable length packets, the thermometer decoder having n inputs corresponding to a size of one of the variable length packets and m outputs, the thermometer decoder to select how many of the m outputs are active based on the n inputs to set the size of the one of the variable length packets, and a first shifter coupled to the thermometer decoder to receive the m outputs and an address input and to determine an amount of rotation for the m outputs based on the address input.

15. The system of claim 14, further comprising a media access controller coupled to the storage buffer.

16. The system of claim 14, further comprising a system packet interface coupled between a network processor mid the storage buffer.

17. The system of claim 16, further comprising a system packet interface bus coupled between the network processor and the system packet interface.

18. The system of claim 14, wherein m equals $2^n-1$.

19. The system of claim 14, wherein the data array includes a plurality of elements, each of which may load data from a selected one of the variable length packets.

20. The system of claim 19, wherein the data array is to write a second variable length packet to a second portion of the plurality of elements via a second port of the data array while a first variable length packet is written to a first portion of the plurality of elements via a first port of to data array, wherein the first variable length packet is to be pre-rotated prior to being written and the second variable length packet is written without the pre-rotation, and to transmit an output word from the data array corresponding to one of the first and second variable length packets, wherein the output word has a fixed length.

* * * * *